United States Patent
Fu

(10) Patent No.: US 9,806,601 B2
(45) Date of Patent: Oct. 31, 2017

(54) BOOST CONVERTER AND METHOD

(71) Applicant: Futurewei Technologies, Inc., Plano, TX (US)

(72) Inventor: Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/671,181

(22) Filed: Mar. 27, 2015

(65) Prior Publication Data

US 2016/0285371 A1    Sep. 29, 2016

(51) Int. Cl.
| H02M 3/24 | (2006.01) |
| H02M 1/42 | (2007.01) |
| H02M 3/158 | (2006.01) |
| H02M 7/483 | (2007.01) |
| H02M 1/00 | (2006.01) |

(52) U.S. Cl.
CPC ......... *H02M 1/4225* (2013.01); *H02M 3/158* (2013.01); *H02M 7/483* (2013.01); *H02M 2001/007* (2013.01)

(58) Field of Classification Search
CPC .......... H02J 3/36; H02M 5/4585; H02M 1/12; H02M 7/5395; H02M 7/537; H02M 7/5387; H02M 7/5383; H02M 3/335075; H02M 3/156; H02M 3/158; Y02B 10/126; H02K 47/10; G05F 1/613
USPC ... 363/35, 37, 40, 41, 89, 97, 101, 131-133; 323/222, 223, 225
See application file for complete search history.

(56) References Cited

U.S. PATENT DOCUMENTS

| 5,654,591 | A | * | 8/1997 | Mabboux | H02J 9/06 307/64 |
| RE39,060 | E | * | 4/2006 | Okui | H02M 1/4208 363/45 |
| 8,184,460 | B2 | * | 5/2012 | O'Brien | G05F 1/67 363/97 |
| 2006/0238941 | A1 | * | 10/2006 | Ingemi | H02J 9/062 361/92 |
| 2007/0096700 | A1 | | 5/2007 | Weng et al. | |
| 2007/0211498 | A1 | | 9/2007 | Van Casteren | |
| 2010/0315849 | A1 | * | 12/2010 | Ingemi | H02J 9/062 363/89 |
| 2013/0002215 | A1 | * | 1/2013 | Ikeda | H02M 3/158 323/271 |
| 2013/0039102 | A1 | * | 2/2013 | Lai | H02M 3/158 363/101 |
| 2013/0107599 | A1 | * | 5/2013 | Shekhawat | H02M 7/487 363/131 |
| 2013/0119961 | A1 | * | 5/2013 | Okuda | H02M 3/158 323/299 |

(Continued)

*Primary Examiner* — Nguyen Tran
(74) *Attorney, Agent, or Firm* — Slater Matsil, LLP

(57) ABSTRACT

A converter comprises a first switch, a second switch, a first blocking device and a second blocking device connected in series between two terminals of an output capacitor, an inductor coupled between a dc input source and a common node of the second switch and the first blocking device and a capacitor coupled between a common node of the first switch and the second switch, and a common node of the first blocking device and the second blocking device, wherein a voltage across the capacitor is configured to be adjustable through adjusting duty cycles of the first switch and the second switch.

17 Claims, 9 Drawing Sheets

(56) References Cited

U.S. PATENT DOCUMENTS

2015/0138442 A1\* 5/2015 Joo .................... H02M 1/4225
                                                                             348/730
2016/0197562 A1\* 7/2016 Kondo ................ H02M 7/2176
                                                                             363/126

\* cited by examiner

BOOST CONVERTER AND METHOD

TECHNICAL FIELD

The present disclosure relates to a power converter, and, in particular embodiments, to a multi-level boost converter.

BACKGROUND

Renewable energy sources include solar energy, wind power, tidal wave energy and the like. A solar power conversion system may include a plurality of solar panels connected in series or in parallel. The output of the solar panels may generate a variable dc voltage depending on a variety of factors such as time of day, location and sun tracking ability. In order to regulate the output of the solar panels, the output of the solar panels may be coupled to a power regulator so as to achieve a regulated output voltage at the output of the solar power conversion system. In addition, the solar panels may be connected with a backup battery system through a battery charge control apparatus. During the day, the backup battery is charged through the output of the solar panels. When the power utility fails or the solar panels are an off-grid power system, the backup battery provides electricity to the loads coupled to the solar panels.

To achieve an optimized solar power conversion system, boost converters may be used to get the maximum power out of the solar panels of the solar power conversion system. For example, a boost converter may be coupled between the output of a solar panel and an input of a solar inverter. The boost converter is controlled such that the output of the boost converter generates a suitable voltage source for the solar inverter coupled to the boost converter.

A boost converter comprises a switching element, a blocking device, at least one energy storage element and an output filter. The switching element may be implemented as a MOSFET transistor. The blocking device may be implemented as a diode. The energy storage element may be implemented as an inductor. The output filter may be implemented as a capacitor. The diode and the MOSFET transistor are connected in series across the capacitor. The inductor is coupled between an input power source and the common node of the diode and the MOSFET transistor. The boost converter is used to provide an output voltage higher than an input voltage from the input power source by modulating the width of a pulse applied to the MOSFET transistor.

SUMMARY

These and other problems are generally solved or circumvented, and technical advantages are generally achieved, by preferred embodiments of the present disclosure which provide a multi-level boost converter.

In accordance with an embodiment, a converter comprises a first switch connected in series to a second switch, a first blocking device connected in series to a second blocking device, wherein the second switch is connected to the first blocking device and an output capacitor is connected to the first switch and the second blocking device, an inductor coupled between a dc input source and a common node of the second switch and the first blocking device and a capacitor coupled between a common node of the first switch and the second switch, and a common node of the first blocking device and the second blocking device, wherein a voltage across the capacitor is configured to be adjustable through adjusting duty cycles of the first switch and the second switch.

In accordance with another embodiment, a system comprises a converter having a first input connected to a positive terminal of a dc power source and a second input connected to a negative terminal of the dc power source, wherein the converter comprises a first switch connected in series to a second switch, a first blocking device connected in series to a second blocking device, wherein the second switch is connected to the first blocking device and an output capacitor is connected to the first switch and the second blocking device and a capacitor coupled between a common node of the first switch and the second switch, and a terminal of the first blocking device. The system further comprises an inverter connected to the two output terminals of the converter.

In accordance with yet another embodiment, a method comprises providing a converter comprising a first switch connected in series to a second switch, a first blocking device connected in series to a second blocking device, wherein the second switch is connected to the first blocking device and an output capacitor is connected to the first switch and the second blocking device, an inductor coupled between a dc input source and a common node of the second switch and the first blocking device and a capacitor coupled between a common node of the first switch and the second switch, and a common node of the first blocking device and the second blocking device.

The method further comprises detecting a voltage across the capacitor, increasing a duty cycle of the second switch when the voltage across the capacitor is greater than a predetermined threshold and increasing a duty cycle of the first switch when the predetermined threshold is greater than the voltage across the capacitor.

An advantage of an embodiment of the present disclosure is a multi-level boost converter providing a higher efficiency power conversion stage between a solar panel and an inverter.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a multi-level boost converter for solar applications. The disclosure may also be applied, however, to a variety of power applications. Hereinafter, various embodiments will be explained in detail with reference to the accompanying drawings.

Figure 1:
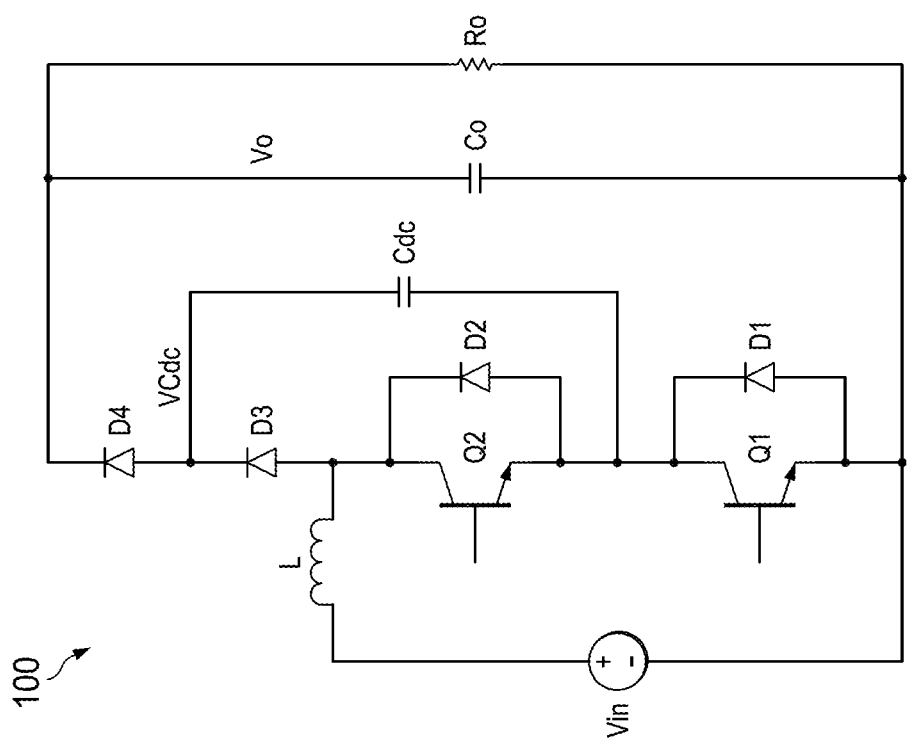
FIG. 1 illustrates a schematic diagram of a multi-level boost converter in accordance with various embodiments of the present disclosure.

FIG. 1 illustrates a schematic diagram of a multi-level boost converter in accordance with various embodiments of the present disclosure. The multi-level boost converter 100 comprises an input inductor L, a first switch Q1, a second switch Q2, a first blocking device, a second blocking device, an intermediate capacitor Cdc and an output capacitor Co. As shown in FIG. 1, the multi-level boost converter 100 is coupled between an input power source Vin and a load Ro.

In some embodiments, the first blocking device is implemented as a first diode D3 as shown in FIG. 1. The second blocking device is implemented as a second diode D4. Throughout the description, the first blocking device and the second blocking device are alternatively referred to as the first diode D3 and the second diode D4 respectively.

In comparison with a conventional boost converter, the second switch Q2, the first diode D3 and the intermediate capacitor Cdc are employed to reduce voltage stresses on the switches and diodes. For example, the voltage rating of Q2 is half the voltage rating of Q1. Likewise, the voltage rating of D3 is half the voltage rating of D4.

As shown in FIG. 1, the first switch Q1, the second switch Q2, the first diode D3 and the second diode D4 are connected in series between two terminals of the output capacitor Co. The input inductor L is coupled between the input power source Vin and a common node of the first diode D3 and the second switch Q2. The intermediate capacitor Cdc has a first terminal connected to a common node of diodes D3 and D4, and a second terminal connected to a common node of switches Q1 and Q2.

In accordance with an embodiment, the switches (e.g., switches Q1 and Q2) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

It should be noted that when switches Q1 and Q2 are implemented by MOSFET devices, the body diodes of switches Q1 and Q2 can be used to provide a freewheeling channel. On the other hand, when switches Q1 and Q2 are implemented by IGBT devices, a separate freewheeling diode (e.g., D1 and D2) is required to be connected in parallel with its corresponding switch.

As shown in FIG. 1, diodes D1 and D2 are required to provide reverse conducting paths for the multi-level boost converter 100. In other words, diodes D1 and D2 are anti-parallel diodes. In some embodiments, diodes D1 and D2 are co-packaged with their respective IGBT devices. In alternative embodiments, diodes D1 and D2 are placed outside their respective IGBT devices.

The multi-level boost converter 100 includes four different operating modes according to the on/off statuses of switches Q1 and Q2. In a first operating mode, switch Q1 is turned on and switch Q2 is turned off. The power from the input power source Vin is used to charge the intermediate capacitor Cdc. The detailed operating principles of the first operating mode will be described below with respect to FIG. 2.

It should be noted that, in the first operating mode, the current flowing through the input inductor L may ramp up or down depending on different combinations of the input voltage, the voltage across the intermediate capacitor and the output voltage. The current flowing through the input inductor L will be described in detail below with respect to FIGS. 6-8.

In a second operating mode, switch Q2 is turned on and switch Q1 is turned off. The energy stored in the intermediate capacitor Cdc is discharged to the output capacitor Co. It should be noted that, in the second operating mode, the current flowing through the input inductor L may ramp up or down depending on different combinations of the input voltage, the voltage across the intermediate capacitor and the output voltage.

In a third operating mode, both switches Q1 and Q2 are turned off. The energy stored in the input inductor L is used to charge the output capacitor Co. The detailed operating principles of the third operating mode will be described below with respect to FIG. 4. In a fourth operating mode, both switches Q1 and Q2 are turned on. The current flowing through the input inductor L ramps up and energy is stored in the input inductor L accordingly. The detailed operating principles of the fourth operating mode will be described below with respect to FIG. 5.

Figure 2:
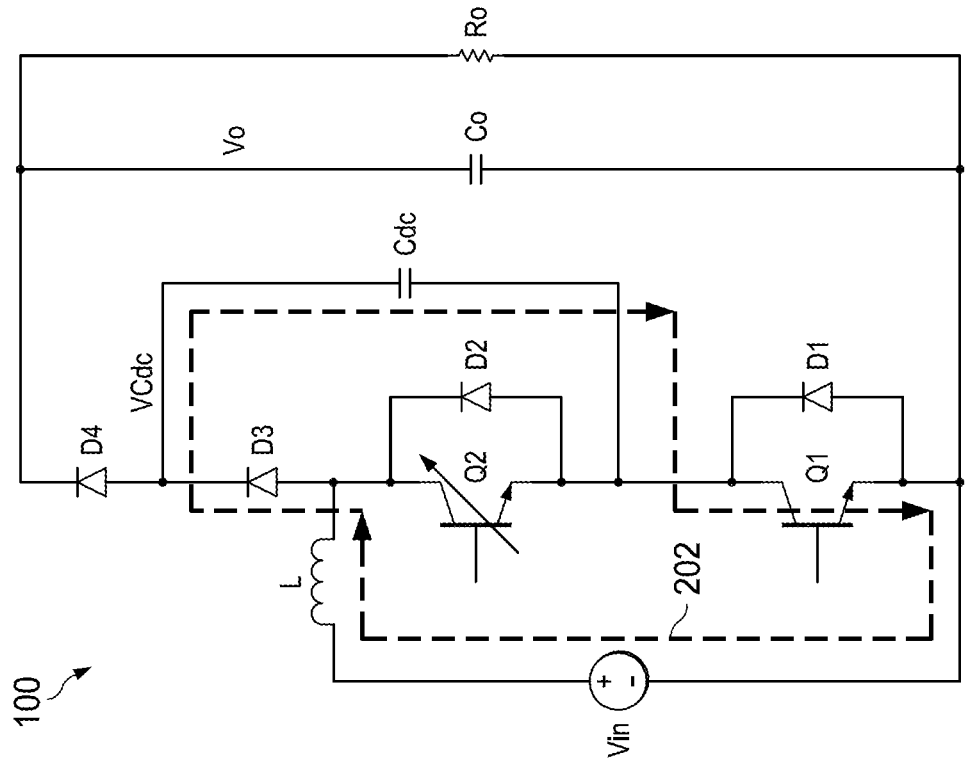
FIG. 2 illustrates a current flow of the multi-level boost converter in the first operating mode in accordance with various embodiments of the present disclosure.

FIG. 2 illustrates a current flow of the multi-level boost converter in the first operating mode in accordance with various embodiments of the present disclosure. During the first operating mode, switch Q2 is turned off as indicated by the arrow placed on top of the symbol of Q2. Since switch Q1 is turned on, a conductive path is established as indicated by the dashed line 202 shown in FIG. 2. The conductive path is formed by L, D3, Cdc and Q1. The current flows from the positive terminal of the input power source Vin to the negative terminal of the input power source Vin through the conductive path shown in FIG. 2.

During the first operating mode, the intermediate capacitor Cdc is charged and energy is stored in the intermediate capacitor Cdc accordingly. The current flowing through the inductor L may ramp up or down depending on the voltage applied across the inductor L. More particularly, when Vin is greater than VCdc, the current flowing through the inductor L ramps up and the energy stored in the inductor L increases accordingly. When VCdc is greater than Vin, the current flowing through the inductor L ramps down and the energy stored in the inductor L decreases accordingly.

Figure 3:
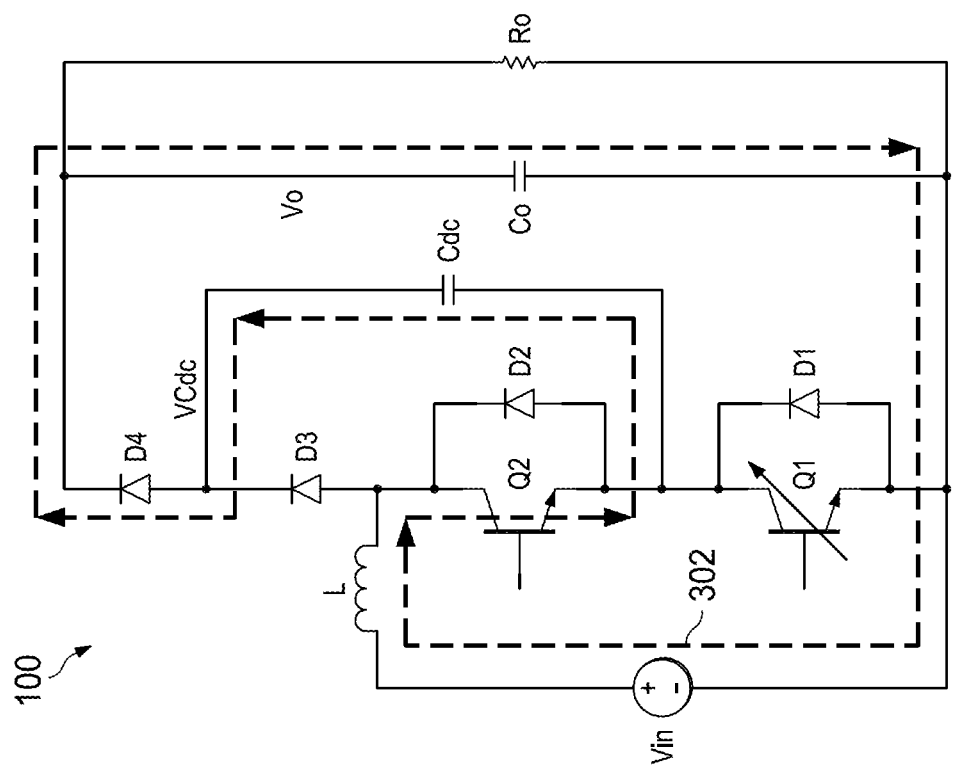
FIG. 3 illustrates a current flow of the multi-level boost converter in the second operating mode in accordance with various embodiments of the present disclosure.

FIG. 3 illustrates a current flow of the multi-level boost converter 100 in the second operating mode in accordance with various embodiments of the present disclosure. During the second operating mode, switch Q1 is turned off as indicated by the arrow placed on top of the symbol of Q1. Since switch Q2 is turned on, a conductive path is established as indicated by the dashed line 302 shown in FIG. 3. The conductive path is formed by L, Q2, Cdc, D4 and Co. The current flows from the positive terminal of the input power source Vin to the negative terminal of the input power source Vin through the conductive path shown in FIG. 3.

During the second operating mode, the intermediate capacitor Cdc is discharged to the load Ro and the output capacitor Co. The current flowing through the inductor L may ramp up or down depending on the voltage applied across the inductor L. More particularly, when the sum of Vin and VCdc is greater than Vo, the current flowing through the inductor L ramps up and the energy stored in the inductor L increases accordingly. When the sum of Vin and VCdc is less than Vo, the current flowing through the inductor L ramps down and the energy stored in the inductor L decreases accordingly. It is understood that current does not flow through D3 as a result of reverse bias within the multi-level boost converter 100.

Figure 4:
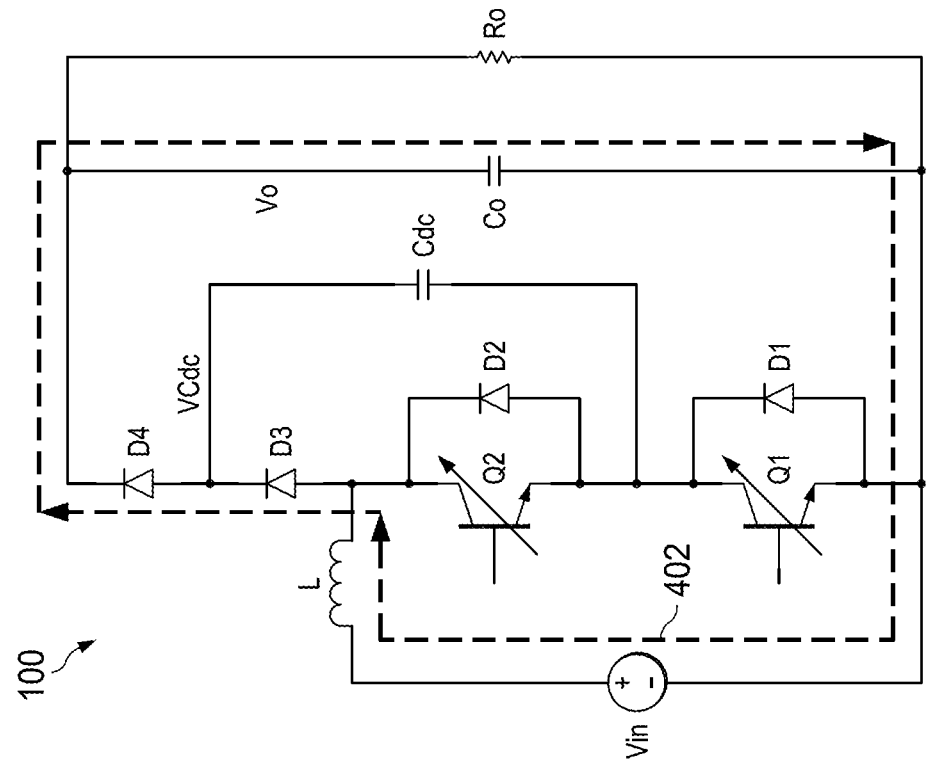
FIG. 4 illustrates a current flow of the multi-level boost converter in the third operating mode in accordance with various embodiments of the present disclosure.

FIG. 4 illustrates a current flow of the multi-level boost converter in the third operating mode in accordance with various embodiments of the present disclosure. During the third operating mode, both switches Q1 and Q2 are turned off as indicated by the arrows placed on top of the symbols of Q1 and Q2. A conductive path is established as indicated by the dashed line 402 shown in FIG. 4. The conductive path is formed by L, D3, D4 and Co. The current flows from the positive terminal of the input power source Vin to the negative terminal of the input power source Vin through the conductive path shown in FIG. 4. During the third operating mode, the energy stored in the inductor L is discharged to the load Ro and the output capacitor Co. As a result, the current flowing through the inductor L ramps down.

Figure 5:
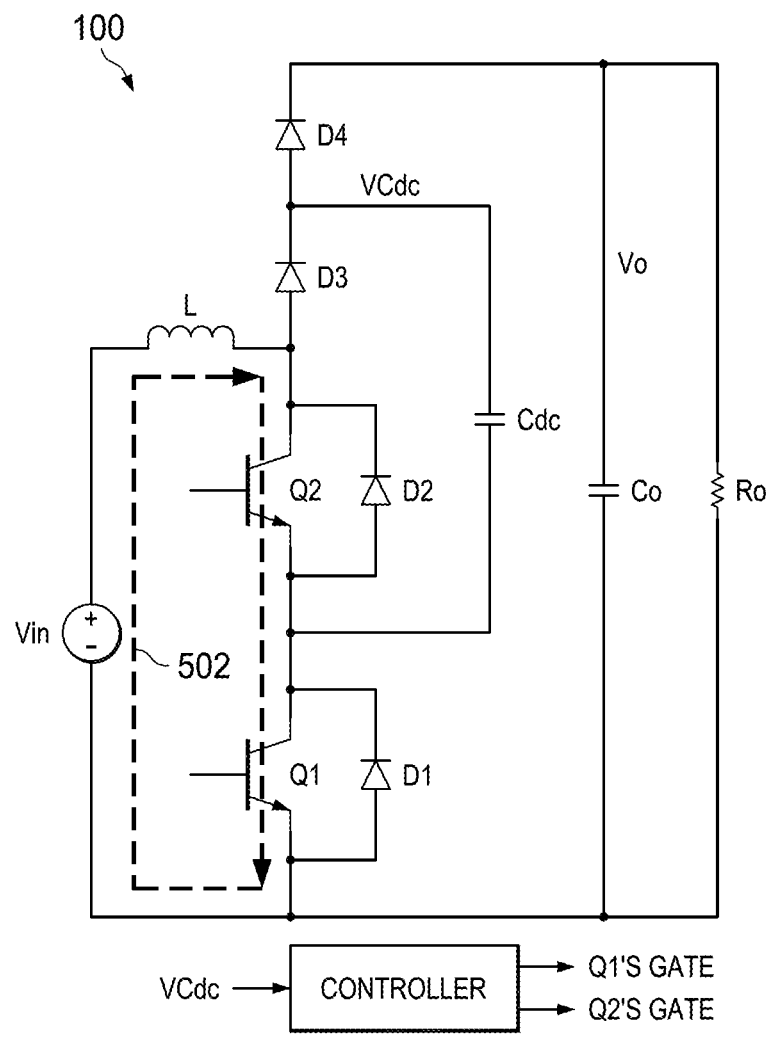
FIG. 5 illustrates a current flow of the multi-level boost converter in the fourth operating mode in accordance with various embodiments of the present disclosure.

FIG. 5 illustrates a current flow of the multi-level boost converter 100 in the fourth operating mode in accordance with various embodiments of the present disclosure. During the fourth operating mode, both switches Q1 and Q2 are turned on. A conductive path is established as indicated by the dashed line 502 shown in FIG. 5. The conductive path is formed by L, Q2 and Q1. The current flows from the positive terminal of the input power source Vin to the negative terminal of the input power source Vin through the conductive path shown in FIG. 5. During the fourth operating mode, the current flowing through the inductor L ramps up and the energy stored in the inductor L increases accordingly.

Referring back to FIG. 1, during steady operation, the duty cycle of Q1 is equal to the duty cycle of Q2. According to the volt-second balance principle, the voltage at the output of the multi-level boost converter 100 is given by the following equation:

$$Vo = \frac{Vin}{1-D} \quad (1)$$

where D is the steady state duty cycle of switches Q1 and Q2, Vo is the voltage out, and Vin is the voltage in.

In some embodiments, the voltage across the capacitor Cdc is adjustable through changing the duty cycles of Q1 and Q2. More particularly, the voltage across Cdc may increase by operating the converter under a condition satisfying the duty cycle of Q1 is greater than the duty cycle of Q2. On the other hand, the voltage across Cdc may decrease by operating the converter under a condition satisfying the duty cycle of Q1 is less than the duty cycle of Q2.

While the voltage across Cdc is adjustable, during steady operation the voltage VCdc may stay a stable voltage and the duty cycle of Q1 is equal to the duty cycle of Q2. A controller including a feedback loop may be used to monitor VCdc so as to maintain VCdc stable during steady operation. For example, if VCdc is not stable, the controller may slightly adjust the duty cycle of Q1 and/or the duty cycle of Q2 to achieve a stable VCdc. The feedback loop may comprise a predetermined threshold. The controller may regulate VCdc through increasing a duty cycle of the second switch when the voltage across the capacitor Cdc is greater than the predetermined threshold and increasing a duty cycle of the first switch when the predetermined threshold is greater than the voltage across the capacitor.

It should be noted that while the example throughout the description is based upon a non-isolated boost converter, the multi-level boost converter 100 shown in FIG. 1 may have many variations, alternatives, and modifications. For example, the multi-level boost converter 100 shown in FIG. 1 may include a transformer to achieve an isolated multi-level boost converter. The non-isolated topology illustrated herein is limited solely for the purpose of clearly illustrating the aspects of the various embodiments. The present disclosure is not limited to any particular power topology.

As example embodiments, in different voltage applications Q1 and D4 in the multi-level boost converter 100 may be implemented using different ratings. For example, in a 1000 V solar application, Q1 and D4 can be implemented as semiconductor devices having a voltage rating of 1200 V. Q2 and D3 can be implemented as semiconductor devices having a voltage rating of 600 V.

In another example, in a 1200 solar application, the voltage across Cdc is set to 500 V. As a result, the voltage stresses across Q2 and D3 are about 500 V. Q2 and D3 can be implemented as semiconductor devices having a voltage rating of 650 V. The voltage stresses across Q1 and D4 are equal to the difference between the output voltage (1200 V) of the multi-level boost converter and the voltage across Cds. In other words, the voltage stresses across Q1 and D4 are about 700 V. Since the voltage stresses across Q2 and D3 are low, the switching losses are reduced accordingly.

One advantageous feature of having low voltage rating devices (e.g., Q2 and D3) is the low voltage stresses on Q2 and D3 help to reduce conduction losses as well as switching losses. As a result, the efficiency of the multi-level boost converter 100 is improved.

Figure 6:
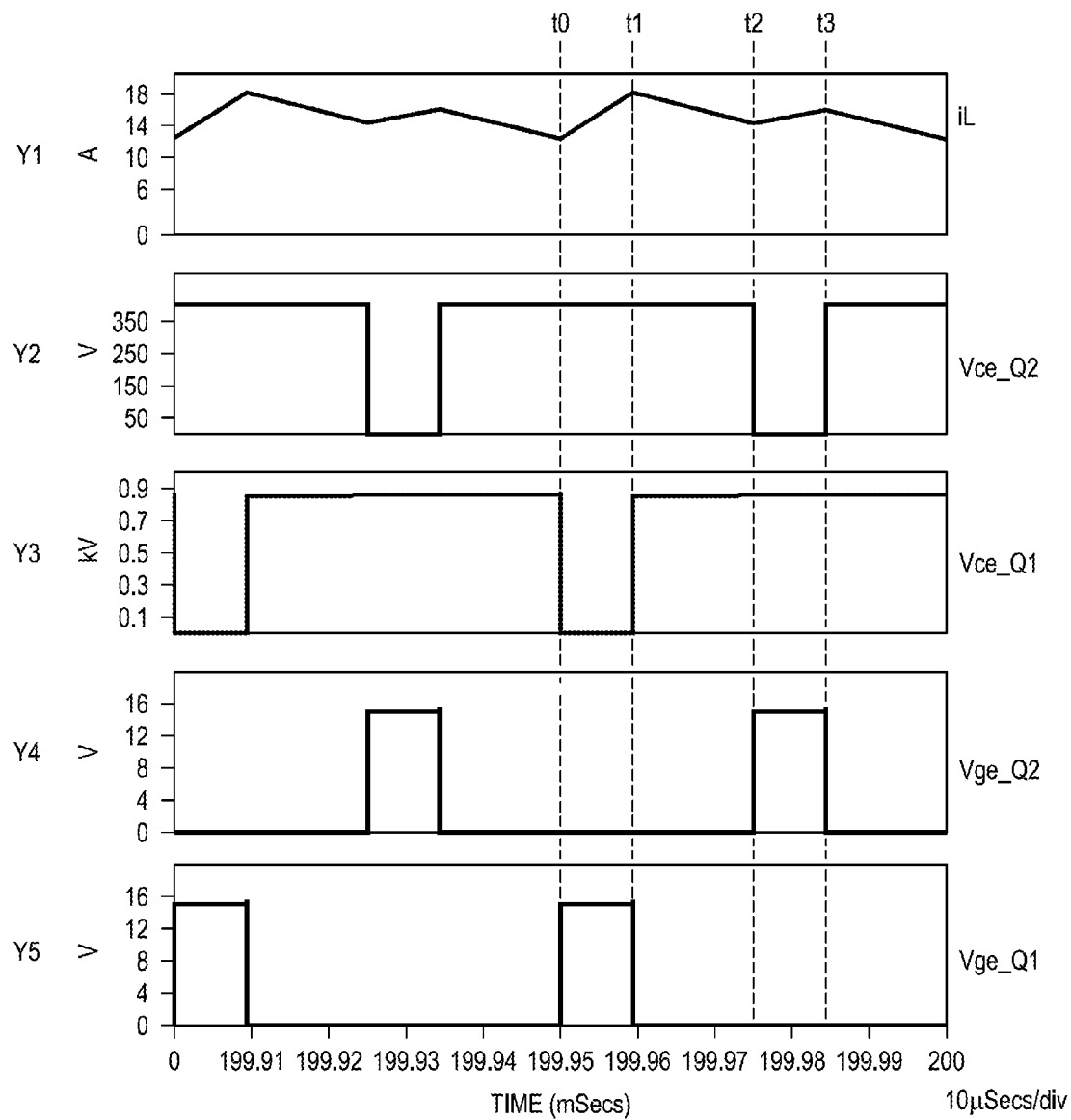
FIG. 6 illustrates switching waveforms of the multi-level boost converter operating with a duty cycle less than 50% in accordance with various embodiments of the present disclosure.

FIG. 6 illustrates switching waveforms of the multi-level boost converter operating with a duty cycle less than 50% in accordance with various embodiments of the present disclosure. The horizontal axis of FIG. 6 represents intervals of time. The unit of the horizontal axis is micro second. There are five vertical axes. The first vertical axis represents the current flowing through the inductor L. The second vertical axis represents the voltage across the switch Q2. The third vertical axis represents the voltage across the switch Q1. The fourth vertical axis represents the gate drive signal applied to the switch Q2. The fifth vertical axis represents the gate drive signal applied to the switch Q1.

The waveforms are obtained based upon the following operating conditions. Vin is equal to 1000 V. Vo is equal to 1200 V. During steady operation, VCdc is equal to 400 V. It should be noted VCdc is adjustable. Depending on different applications and design needs, VCdc may be adjusted to a level either greater than 400 V or less than 400 V.

As shown in FIG. 6, the duty cycle of the gate drive signal of Q1 is approximately equal to the duty cycle of the gate drive signal of Q2. Both the duty cycle of Q1 and the duty cycle of Q2 are less than 50%. When Q1 is turned on and Q2 is turned off (e.g., the period from t0 to t1 as shown in FIG. 6), the multi-level boost converter operates in the first operating mode described in detail above with respect to FIG. 2. During the first operating mode, the current flowing through the inductor L ramps up because Vin is greater than VCdc. As a result, energy is accumulated in the inductor L.

During the period from t1 to t2, both Q1 and Q2 are turned off. The multi-level boost converter 100 enters the third operating mode described above with respect to FIG. 4. During the third operating mode, the energy stored in the inductor L is discharged to the load Ro and the output capacitor Co. As a result, the current flowing through the inductor L ramps down as shown in FIG. 6.

During the period from t2 to t3, Q2 is turned on and Q1 remains off. The multi-level boost converter 100 enters the second operating mode described above with respect to FIG. 3. During the second operating mode, since the sum of Vin and VCdc is greater than Vo, the current flowing through the inductor L ramps up and the energy stored in the inductor L increases accordingly as shown in FIG. 6.

Figure 7:
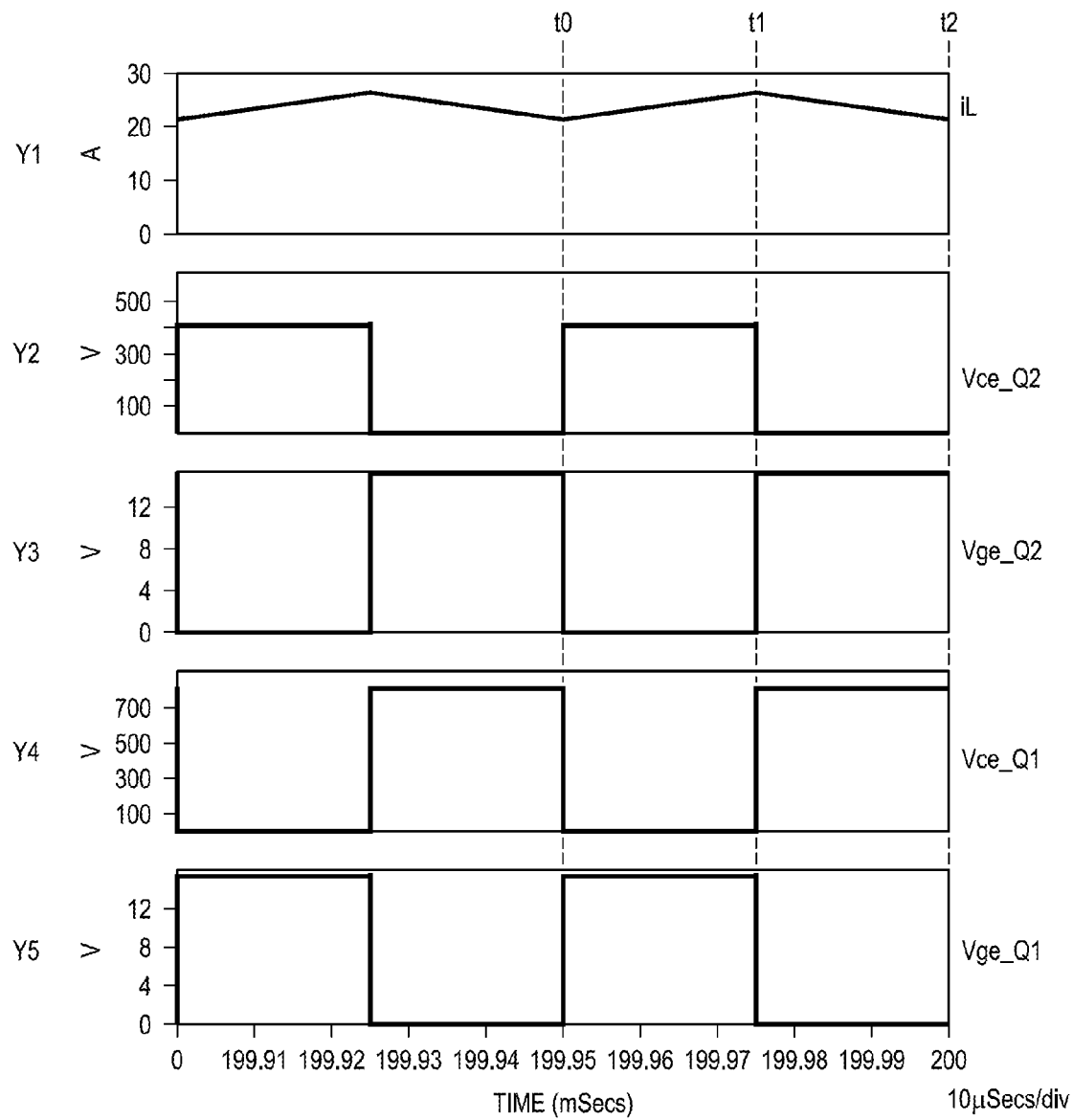
FIG. 7 illustrates switching waveforms of the multi-level boost converter operating with a duty cycle of 50% in accordance with various embodiments of the present disclosure.

FIG. 7 illustrates switching waveforms of the multi-level boost converter operating with a duty cycle of 50% in accordance with various embodiments of the present disclosure. The horizontal axis of FIG. 7 represents intervals of time. There are five vertical axes. The first vertical axis represents the current flowing through the inductor L. The second vertical axis represents the voltage across the switch Q2. The third vertical axis represents the gate drive signal applied to the switch Q2. The fourth vertical axis represents the voltage across the switch Q1. The fifth vertical axis represents the gate drive signal applied to the switch Q1.

The waveforms are obtained based upon the following operating conditions. Vin is equal to 600 V. Vo is equal to 1200 V. During steady operation, VCdc is equal to 400 V. It should be noted VCdc is adjustable. Depending on different applications and design needs, VCdc may be adjusted to a level either greater than 400 V or less than 400 V.

As shown in FIG. 7, the duty cycle of the gate drive signal of Q1 is approximately equal to the duty cycle of the gate drive signal of Q2. Both the duty cycle of Q1 and the duty cycle of Q2 are approximately equal to 50%. When Q1 is turned on and Q2 is turned off (e.g., the period from t0 to t1 as shown in FIG. 7), the multi-level boost converter operates in the first operating mode described above with respect to FIG. 2. During the first operating mode, the current flowing through the inductor L ramps up because Vin is greater than VCdc. As a result, energy is accumulated in the inductor L.

During the period from t1 to t2, Q2 is turned on and Q1 is turned off. The multi-level boost converter 100 enters the second operating mode described above with respect to FIG. 3. During the second operating mode, since the sum of Vin and VCdc is less than Vo, the current flowing through the inductor L ramps down and the energy stored in the inductor L decreases accordingly as shown in FIG. 7.

Figure 8:
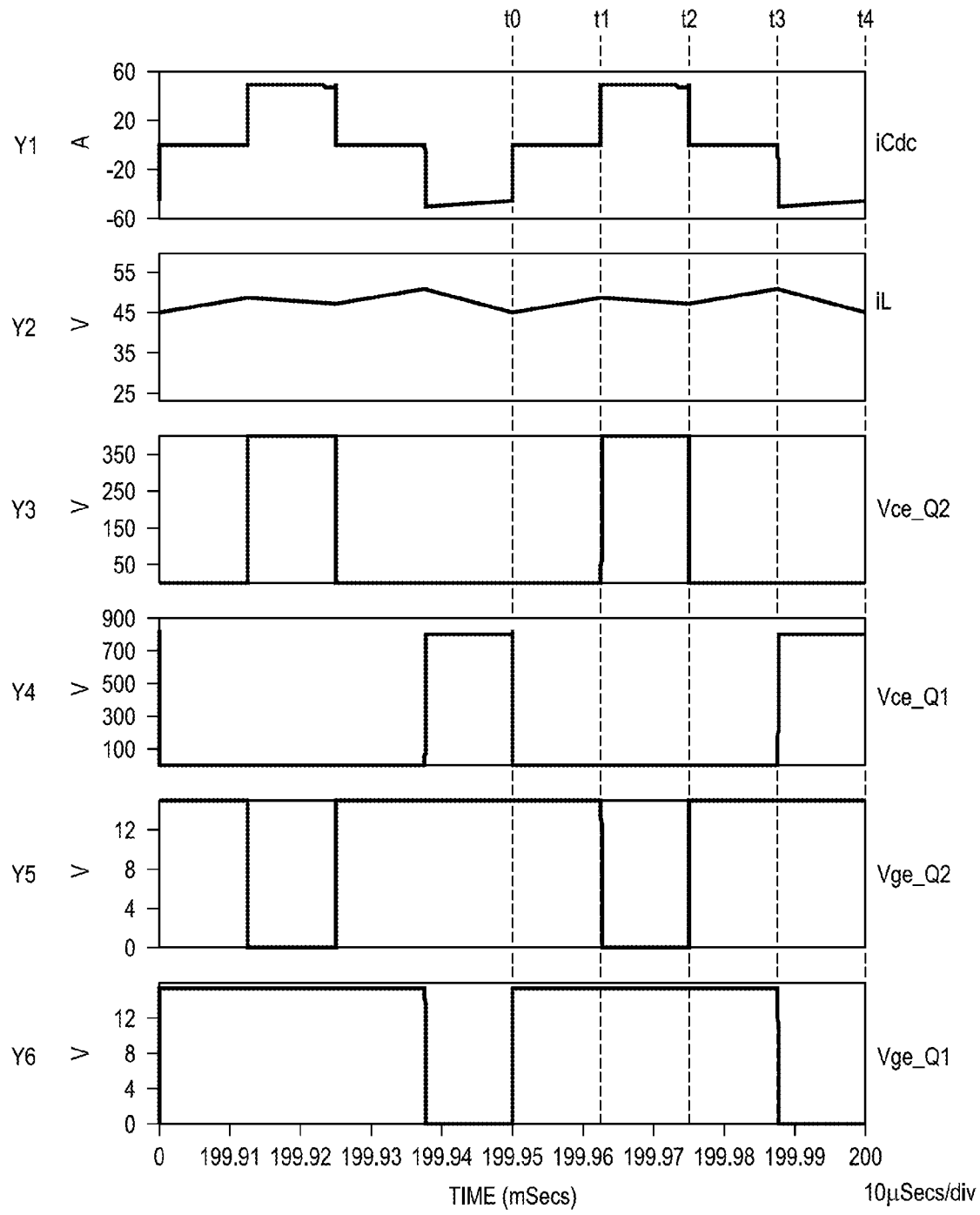
FIG. 8 illustrates switching waveforms of the multi-level boost converter operating with a duty cycle greater than 50% in accordance with various embodiments of the present disclosure.

FIG. 8 illustrates switching waveforms of the multi-level boost converter operating with a duty cycle greater than 50% in accordance with various embodiments of the present disclosure. The horizontal axis of FIG. 8 represents intervals of time. There are six vertical axes. The first vertical axis represents the current flowing through the capacitor Cdc. The second vertical axis represents the current flowing through the inductor L. The third vertical axis represents the voltage across the switch Q2. The fourth vertical axis represents the voltage across the switch Q1. The fifth vertical axis represents the gate drive signal applied to the switch Q2. The sixth vertical axis represents the gate drive signal applied to the switch Q1.

The waveforms are obtained based upon the following operating conditions. Vin is equal to 300 V. Vo is equal to 1200 V. During steady operation, VCdc is equal to 400 V. It should be noted VCdc is adjustable. Depending on different applications and design needs, VCdc may be adjusted to a level either greater than 400 V or less than 400 V.

As shown in FIG. 8, the duty cycle of the gate drive signal of Q1 is approximately equal to the duty cycle of the gate drive signal of Q2. Both the duty cycle of Q1 and the duty cycle of Q2 are greater than 50%. During the period from t0 to t1, both Q1 and Q2 are turned on. The multi-level boost converter 100 enters the fourth operating mode described above with respect to FIG. 5. During the fourth operating mode, the current flowing through the inductor L ramps up and the energy stored in the inductor L increases accordingly as shown in FIG. 8.

During the period from t1 to t2, Q2 is turned off and Q1 remains on. The multi-level boost converter 100 enters the first operating mode described above with respect to FIG. 2. During the first operating mode, since VCdc is greater than Vin, the current flowing through the inductor L ramps down and the energy stored in the inductor L decreases accordingly as shown in FIG. 8.

During the period from t3 to t4, Q2 is turned on and Q1 is turned off. The multi-level boost converter 100 enters the second operating mode described above with respect to FIG. 3. During the second operating mode, since the sum of Vin and VCdc is less than Vo, the current flowing through the inductor L ramps down and the energy stored in the inductor L decreases accordingly as shown in FIG. 8.

One advantageous feature of the multi-level boost converter 100 shown in FIG. 1 is the effective ripple frequency of the input inductor L is doubled in comparison with the switching frequency of the multi-level boost converter 100. Thus, the noise of the multi-level boost converter 100 is reduced accordingly.

Figure 9:
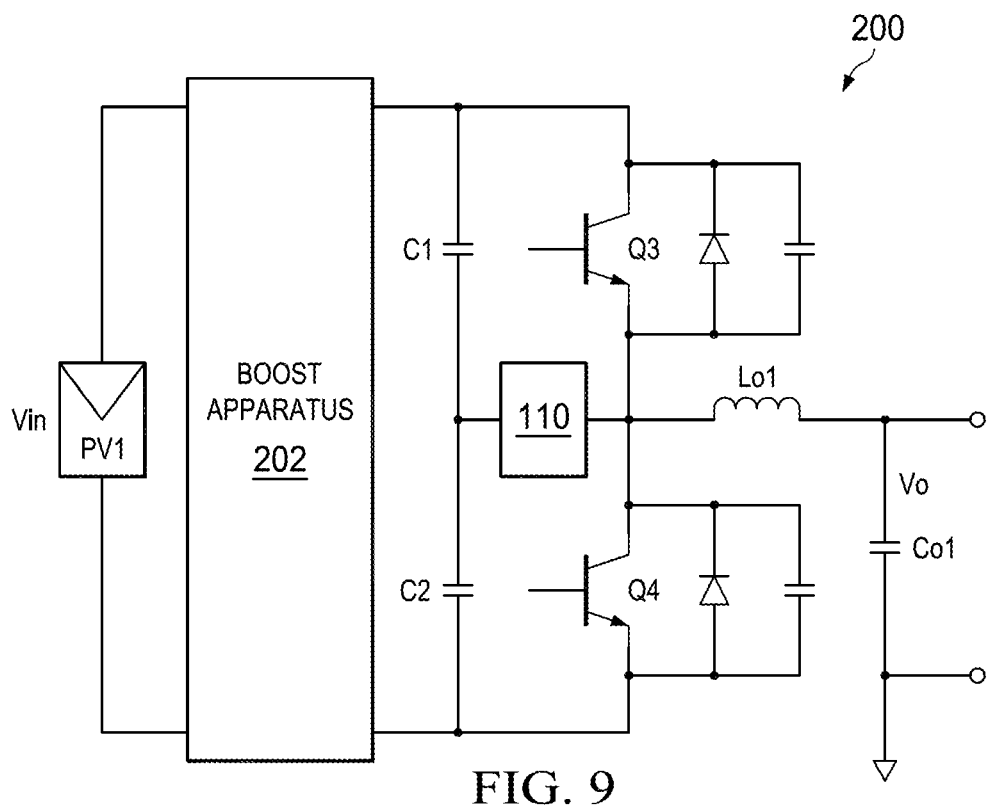
FIG. 9 illustrates a block diagram of an inverter system in accordance with various embodiments of the present disclosure.

FIG. 9 illustrates a block diagram of an inverter system in accordance with various embodiments of the present disclosure. The inverter system 200 comprises a power source PV1, a boost apparatus 202, two input capacitors C1 and C2, a freewheeling apparatus 110, a first inverter switch Q3, a second inverter switch Q4 and an output filter. As shown in FIG. 9, the boost apparatus 202 is coupled between the power source PV1 and the input capacitors C1 and C2. In some embodiments, the boost apparatus 202 can be implemented as the multi-level boost converter shown in FIG. 1. Alternatively, the boost apparatus 202 may be implemented as other suitable multi-level boost converters such as multi-level boost converters shown in FIGS. 10-11.

The power source PV1 shown in FIG. 9 may be implemented as a solar panel. More particularly, in some embodiments, while FIG. 9 illustrate a single power source PV1, the power source PV1 may comprise a plurality of solar panels connected in series, in parallel, any combinations thereof and the like. Two input capacitors C1 and C2 are connected in series. As shown in FIG. 9, the series-connected input capacitors C1 and C2 are coupled to the output terminals of the boost apparatus 202.

The output filter is formed by an inductor Lo1 and a capacitor Co1. As shown in FIG. 1, the input of the output filter is coupled to the common node of the switches Q3 and Q4. The switch Q3 is connected between the positive terminal of C1 and the input of the output filter. The switch Q4 is connected between the negative terminal of C2 and the input of the output filter.

In accordance with an embodiment, the switches (e.g., switches Q3 and Q4) may be an insulated gate bipolar transistor (IGBT) device. Alternatively, the switching element can be any controllable switches such as metal oxide semiconductor field-effect transistor (MOSFET) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices and the like.

The freewheeling apparatus 110 may be coupled between the input of the output filter and the common node of C1 and C2. In some embodiments, the freewheeling apparatus 110 may provide a conductive path for the current flowing in the switches (e.g., switch Q3) after the switches are turned off. The operation principle of the inverter is well known, and hence is not discussed in detail herein to avoid repetition.

Figure 10:
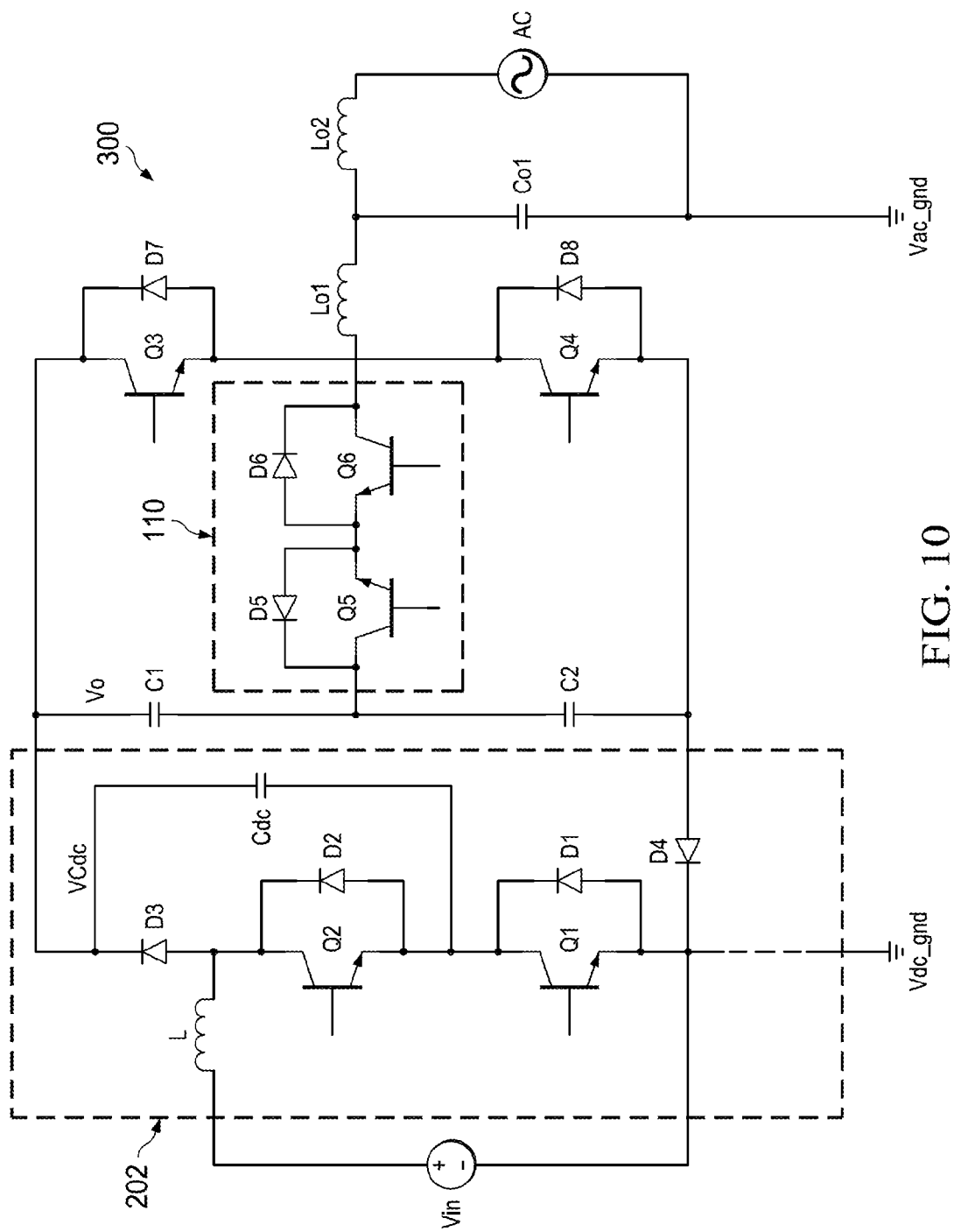
FIG. 10 illustrates a schematic diagram of a first implementation of the inverter system in accordance with various embodiments of the present disclosure.

FIG. 10 illustrates a schematic diagram of a first implementation of the inverter system shown in FIG. 9 in accordance with various embodiments of the present disclosure. The inverter system 300 comprises the boost apparatus 202 and the inverter. The inverter comprises switches Q3, Q4 and the freewheeling apparatus 110. The inputs of the inverter system 300 are connected to the power source Vin. The negative terminal of the power source Vin is coupled to the DC ground of the inverter system 300 through suitable protection devices such as a protection fuse and/or the like. The outputs of the inverter system 300 are coupled to an AC load through a system filter formed by an inductor Lo2.

The freewheeling apparatus 110 comprises switches Q5 and Q6 connected in series to form an isolation switch between the output filter and common node of C1 and C2. It should be noted that the isolation switch formed by a back-to-back connected switch is merely an example, which should not unduly limit the scope of the claims. One of ordinary skill in the art would recognize many variations, alternatives and modifications. For example, a bidirectional isolation switch can be formed by a common emitter bidirectional switch. The common emitter bidirectional switch may comprise two diodes and two IGBT devices. The diodes and IGBT devices are connected in an anti-parallel arrangement. Alternatively, the isolation switch may be implemented by a common collector bidirectional switch. Furthermore, the isolation switch may be implemented by some new semiconductor switches such as anti-paralleled reverse blocking IGBTs arrangement.

The boost apparatus 202 shown in FIG. 10 is similar to the multi-level boost converter 100 shown in FIG. 1 except that the location of the diode D4 is different. As shown in FIG. 10, D3, Q2 and Q1 are connected in series between the positive terminal of C1 and the negative terminal of C2. The capacitor Cdc is connected between a common node of Q1 and Q2, and the positive terminal of C1. The inductor L is connected between the power source Vin and a common node of Q2 and D3. D4 is coupled between the negative terminal of C2 and the negative terminal of Vin. The negative terminal of Vin is further connected to the DC ground of the inverter system 300 through suitable protection devices.

One advantageous feature of having D4 connected between the negative terminal of Vin and the negative terminal of C2 is D4 may prevent reverse current in the inverter system 300 during a system fault such as a ground fault.

Figure 11:
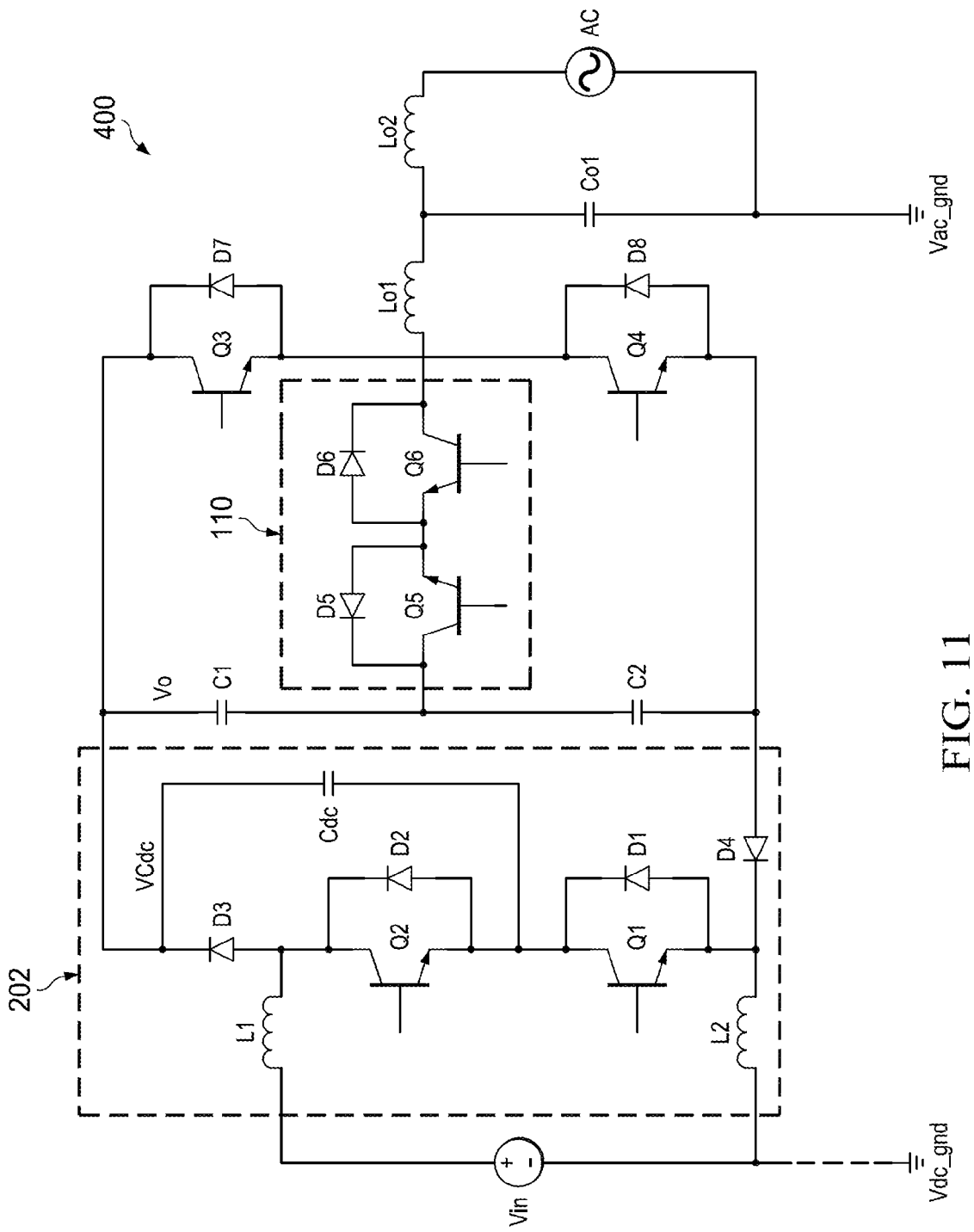
FIG. 11 illustrates a schematic diagram of a second implementation of the inverter system in accordance with various embodiments of the present disclosure.

FIG. 11 illustrates a schematic diagram of a second implementation of the inverter system shown in FIG. 9 in accordance with various embodiments of the present disclosure. The inverter system 400 shown in FIG. 11 is similar to the inverter system 300 shown in FIG. 10 except that the inductor L shown FIG. 10 has been split into two separate input inductors L1 and L2. Two separate input inductors shown in FIG. 11 can help to reduce common mode noise of the inverter system. In order to further reduce common node noise, in some embodiments, the turn-on time of Q1 is sync with the turn-on time of Q2.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present application, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A converter comprising:
a first switch, a second switch and a first blocking device connected in series between a first terminal of an output capacitor and a dc ground, the output capacitor being connected to an input of an inverter;
a second blocking device is connected between the dc ground and a second terminal of the output capacitor;

an inductor coupled between a positive terminal of a dc input source and a common node of the second switch and the first blocking device, wherein a negative terminal of the dc input source is connected to the dc ground; and a capacitor coupled between a common node of the first switch and the second switch, and the first terminal of the output capacitor, wherein a voltage across the capacitor is configured to be adjustable through adjusting duty cycles of the first switch and the second switch, and wherein a voltage stress of the first switch is different from a voltage stress of the second switch when the first switch and the second switch have a same duty cycle.

2. The converter of claim 1, wherein:
the converter is a multi-level boost converter.

3. The converter of claim 1, wherein:
the first blocking device is a first diode; and
the second blocking device is a second diode, wherein the second diode has a higher voltage rating than the first diode.

4. The converter of claim 1, wherein:
the first switch comprises a first IGBT and a first anti-parallel diode; and
the second switch comprises a second IGBT and a second anti-parallel diode, wherein the first IGBT has a higher voltage rating than the second IGBT.

5. The converter of claim 1, further comprising:
a controller configured to detect the voltage across the capacitor and change the duty cycles of the first switch and the second switch.

6. The converter of claim 5, wherein:
the controller is configured to increase the voltage across the capacitor when a duty cycle of the first switch is greater than a duty cycle of the second switch; and
the controller is configured to decrease the voltage across the capacitor when the duty cycle of the second switch is greater than the duty cycle of the first switch.

7. The converter of claim 1, wherein:
in stable operation, a duty cycle of the first switch is equal to a duty cycle of the second switch.

8. The converter of claim 7, further comprising:
a feedback control loop configured to monitor the voltage across the capacitor and regulate the voltage across the capacitor through adjusting the duty cycle of the first switch and the duty cycle of the second switch.

9. A system comprising:
a converter having a first input connected to a positive terminal of a dc output of a solar panel and a second input connected to a negative terminal of the dc output of the solar panel, wherein the converter comprises:
   a first switch, a second switch and a first blocking device connected in series, wherein the first blocking device is connected to a first terminal of an output capacitor, wherein the output capacitor is connected to an input of an inverter, and wherein the output capacitor comprises a first output capacitor and a second output capacitor connected in series;
   a second blocking device is connected to a second terminal of the output capacitor;
   a capacitor coupled between a common node of the first switch and the second switch, and the first terminal of the output capacitor, wherein a voltage stress of the first switch is different from a voltage stress during steady operation;
   a first inductor is connected between the positive terminal of the dc output of the solar panel and a common node of the second switch and the first blocking device; and
   a second inductor is connected between the negative terminal of the dc output of the solar panel and a common node of the first switch and the second blocking device; and
the inverter connected to two output terminals of the converter, wherein the inverter comprises a first inverter switch, a second inverter switch connected in series with the first inverter switch and a freewheeling apparatus connected between a common node of the first inverter switch and the second inverter switch, and a common node of the first output capacitor and the second output capacitor.

10. The system of claim 9, wherein:
the negative terminal of the dc output of the solar panel is coupled to ground.

11. The system of claim 9, wherein:
the first blocking device is a first diode; and
the second blocking device is a second diode, wherein the second diode has a higher voltage rating than the first diode.

12. A method comprising:
providing a converter comprising:
   a first switch, a second switch and a first blocking device connected in series between a first terminal of an output capacitor and a dc ground, the output capacitor being connected to an input of an inverter;
   a second blocking device is connected between the dc ground and a second terminal of the output capacitor;
   an inductor coupled between a dc input source and a common node of the second switch and the first blocking device; and
   a capacitor coupled between a common node of the first switch and the second switch, and the first terminal of the output capacitor, wherein a voltage stress of the first switch is greater than a voltage stress of the second switch when the first switch and the second switch have a same duty cycle;
detecting a voltage across the capacitor;
increasing a duty cycle of the second switch when the voltage across the capacitor is greater than a predetermined threshold; and
increasing a duty cycle of the first switch when the predetermined threshold is greater than the voltage across the capacitor.

13. The method of claim 12, further comprising:
under steady operation, configuring gate drive signals of the first switch and the second switch such that the duty cycle of the first switch is equal to the duty cycle of the second switch.

14. The method of claim 12, further comprising:
varying the voltage across the capacitor through adjusting the duty cycles of the first switch and the second switch.

15. The method of claim 14, further comprising:
increasing the voltage across the capacitor through configuring the first switch and the second switch to operate at a condition satisfying the duty cycle of the first switch is greater than the duty cycle of the second switch.

16. The method of claim 14, further comprising:
decreasing the voltage across the capacitor through configuring the first switch and the second switch to operate at a condition satisfying the duty cycle of the second switch is greater than the duty cycle of the first switch.

17. The method of claim 12, further comprising:
configuring the converter to operate as a multi-level boost converter.

\* \* \* \* \*